United States Patent [19]

Izumi et al.

[11] Patent Number: 5,266,955
[45] Date of Patent: Nov. 30, 1993

[54] LASER-RADAR TYPE DISTANCE MEASURING EQUIPMENT

[75] Inventors: Masao Izumi; Tomonari Ishikawa; Shigeki Hata; Katsuyuki Fukuda, all of Saitama, Japan

[73] Assignee: Kansei Corporation, Omiya, Japan

[21] Appl. No.: 913,677

[22] Filed: Jul. 8, 1992

[30] Foreign Application Priority Data

Jul. 8, 1991 [JP] Japan .................................. 3-167041
Dec. 10, 1991 [JP] Japan .................................. 3-325946

[51] Int. Cl.⁵ ........................ G01S 7/48; G01S 13/93
[52] U.S. Cl. ...................................... 342/70; 342/54; 342/71; 342/72
[58] Field of Search ................ 342/54, 70, 71, 72; 356/5, 28.5

[56] References Cited

U.S. PATENT DOCUMENTS

| | | |
|---|---|---|
| 3,514,776 | 5/1970 | Mulready ................ 342/54 |
| 3,749,197 | 7/1973 | Deutsch ................ 342/71 X |
| 3,848,914 | 11/1974 | Wathen ................ 342/72 X |
| 3,898,652 | 8/1975 | Rashid ................ 342/59 |
| 4,039,782 | 8/1977 | Burckhardt et al. .......... 342/71 X |
| 4,552,456 | 11/1985 | Endo ................ 356/5 |
| 4,692,764 | 9/1987 | Bonar ................ 342/71 |
| 4,703,429 | 10/1987 | Sakata ................ 342/70 X |
| 4,757,450 | 7/1988 | Etoh ................ 342/70 X |
| 4,916,450 | 4/1990 | Davis ................ 342/71 |
| 5,023,617 | 6/1991 | Deering ................ 342/70 |

*Primary Examiner*—John B. Sotomayor
*Attorney, Agent, or Firm*—Foley & Lardner

[57] ABSTRACT

A laser-radar type distance measuring equipment for a motor vehicle is shown, which comprises a probe unit including a laser emitting device and a reflected laser receiving device. The probe unit is mounted on the vehicle body. A steering angle sensor is used for producing an information signal representative of the steered angle of the vehicle. A so-called performance changing device is employed for changing the performance of the probe unit. A control unit controls the performance changing device in accordance with the information signal issued from the steering angle sensor.

11 Claims, 12 Drawing Sheets

LASER-RADAR TYPE DISTANCE MEASURING EQUIPMENT

BACKGROUND OF THE INVENTION

1. Field of the Invention

The present invention relates in general to distance measuring equipment, and more particularly to distance measuring equipment of a laser-radar type. More specifically, the present invention is concerned with laser-radar type distance measuring equipment which is mounted on a motor vehicle to measure the distance from the vehicle to another vehicle running in front, by using the laser beam.

2. Description of the Prior Art

For safety, some modernized motor vehicles are equipped with a distance measuring equipment of the above-mentioned type. That is, when a moving vehicle comes very close to a vehicle in front of it, the equipment gives a visual alarm, an audio alarm or the like to the driver letting him or her know an abnormal approach of the vehicle to the front vehicle. However, due to their inherent constructions, some of them have failed to exhibit a satisfactory performance.

In order to clarify the task of the present invention, two such conventional distance measuring equipment will be outlined with reference to FIGS. 14 to 19 of the accompanying drawings.

Referring to FIGS. 14 to 16, particularly FIG. 14, there is shown a first conventional probe unit 100, which is to be mounted to a front fixed part of a motor vehicle (not shown) with its front part facing forward.

The probe unit 100 comprises generally a housing 101 in which a laser emitting device 102 and a reflected laser receiving device 104 are abreast installed. The housing 101 is mounted on a base plate 110 through left and right brackets 106 and 108. The left bracket 106 is shown in more detail in FIG. 15. Information detected by the probe unit 100 is transmitted through a cable 112 to a control unit (not shown) mounted in the vehicle. The right bracket 108 is incorporated with a position adjuster which includes two position adjusting screws 114 and 116. Thus, the angular position of the probe unit 100 relative to the base plate 110 is adjustable by manipulating the screws 114 and 116. That is, by turning these screws 114 and 116, horizontal and vertical positions of the unit 100 can be adjusted respectively.

Upon requirement of assembly of the probe unit 110 on a vehicle, the base plate 110 is at first secured to the front fixed part of the vehicle by means of bolts or the like. Then, the screws 114 and 116 are manipulated to adjust the angular position of the probe unit 100 (more specifically, the housing 101) relative to the vehicle body. With these steps, the probe unit 100 can be tightly mounted to the vehicle having the laser emitting and receiving devices 102 and 104 directed to a fixed direction.

However, this first conventional distance measuring equipment has such a drawback that when, as is seen from a beam illustrated by a solid line in FIG. 16, the vehicle is traveling along a curve, the laser beam emitted from the laser emitting device 102 fails to make an exact hit on the front vehicle and thus the laser receiving device 104 can not receive the reflected laser sufficiently. Thus, in this case, the distance between the two vehicles can not be measured exactly by the equipment.

Referring to FIGS. 17 to 19, particularly FIG. 17, there is shown the second conventional equipment. For solving the drawback of the above-mentioned first conventional equipment, the second conventional equipment uses a plurality of laser beams (viz., three in the illustrated example) which are emitted forwardly but in different directions as shown in FIG. 18. Thus, at least one of the laser beams has a chance to make an exact hit on the front vehicle.

The equipment comprises a probe unit 100 mounted to the vehicle body in the above-mentioned manner. The probe unit 100 has in its housing 101 a laser emitting device 102 and a reflected laser receiving device 104. Information detected by the probe unit 100 is transmitted to a control unit 200 through a cable 202. Information from a vehicle speed sensor 204 and an ignition switch 206 is also fed to the control unit 200 through respective cables 208 and 210. The probe unit 100 and the control unit 200 are powered by a battery 212.

As is seen from the drawings, the laser emitting device 102 of the probe unit 100 is constructed to issue three pulsed laser beams L, M and R. Counting the time elapsed from the time when a certain pulsed laser beam L, M or R is emitted from the laser emitting device 102 to the time when a part of the laser beam reflected back by a front vehicle is received by the laser receiving device 104, the control unit 200 calculates the distance between the two vehicles.

The vehicle speed sensor 204 is used for increasing the intensity of the laser beams L, M and R in accordance with increase of the vehicle speed. As is known, increasing the intensity of the laser beams L, M and R increases the range of the beams, so that when the vehicle is running at a higher speed, the alarm is issued at relatively early stage, that is, the alarm is given at the time when the distance between the two vehicles is still large. While, when the vehicle is running at a lower speed, such alarm distance becomes smaller than that given at the higher speed running.

However, even this second conventional distance measuring equipment has the following drawback.

Sometimes, the alarm is issued even in a case wherein such alarm is not really necessary. As is seen from FIG. 19, when, during cruising on a curved road, the left laser beam L happens to make a hit on a tree T or the like standing by the road, the equipment gives an unnecessary alarm to the driver irrespective of that fact that a sufficient distance remains between the two vehicles.

SUMMARY OF THE INVENTION

It is therefore an object of the present invention to provide a laser-radar type distance measuring equipment which is free of the above-mentioned drawbacks.

According to a first aspect of the present invention, there is provided a laser-radar type distance measuring equipment for a motor vehicle. This equipment includes a probe unit having a laser emitting device and a reflected laser receiving device, the probe unit being adapted to be mounted on a body of the motor vehicle; a steering angle sensor for producing an information signal representative of the steered angle of the vehicle by measuring the rotation angle of a steering shaft of the vehicle; performance changing unit for changing the performance of the probe unit; and a control unit for controlling the performance changing unit in accordance with the information signal from the steering angle sensor.

According to a second aspect of the present invention, there is provided a laser-radar type distance measuring equipment for a motor vehicle. This equipment includes: a probe unit having a laser emitting device and a reflected laser receiving device; a base member adapted to be securely mounted on the vehicle; a pivotal structure mounted on the base member for permitting a horizontally pivotal movement of the probe unit on the base member; a height adjuster for adjusting a height of the probe unit relative to the base member; an electric actuator for moving the pivotal structure with an electric power; a steering angle sensor for producing an information signal representative of the steered angle of the vehicle by measuring the rotation angle of a steering shaft of the vehicle; and a control unit for controlling the electric actuator in accordance with an information signal issued from the control unit.

According to a third aspect of the present invention, there is provided a laser-radar type distance measuring equipment for a motor vehicle. This equipment includes a probe unit having a laser emitting device and a reflected laser receiving device, the probe unit being adapted to be mounted on the vehicle, the laser emitting device being constructed to emit a plurality of laser beams; a steering angle sensor for producing an information signal representative of the steered angle of the vehicle by measuring the rotation angle of a steering shaft of the vehicle; a vehicle speed sensor for producing an information signal representative of the speed of the vehicle; and a control unit for controlling intensities of outermost two of the laser beams in accordance with the information signals from the steering angle sensor and the vehicle speed sensor.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, embodiments of the present invention will be described in detail with reference to the accompanying drawings. Throughout the description, like parts and constructions are denoted by like numerals, and the terms "left", "right", "upward", "downward" and the like are to be understood with respect to a reader who views the corresponding drawing.

Figure 1:
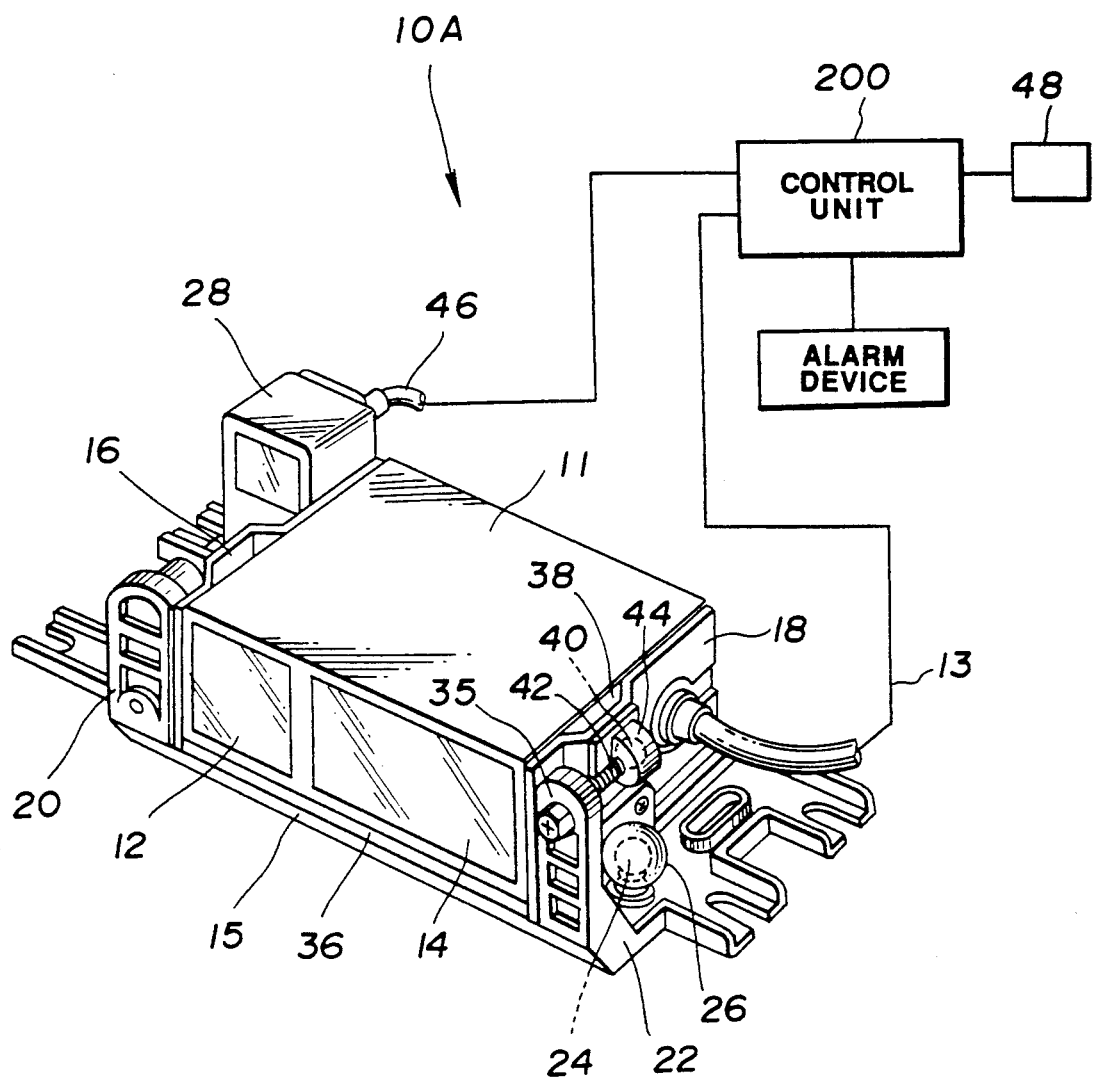
FIG. 1 is a perspective view of a probe unit of a distance measuring equipment which is a first embodiment of the present invention.

Referring to FIGS. 1 to 4, particularly FIG. 1, there is shown a laser-radar type distance measuring equipment which is a first embodiment of the present invention.

In FIG. 1, a probe unit 10A of the equipment of the first embodiment is shown, which is to be mounted to a front fixed part of a motor vehicle (not shown) with its face facing forward.

The probe unit 10A comprises generally a housing 11 in which a laser emitting device 12 and a reflected laser receiving device 14 are abreast installed. Information detected by the probe unit 10A is transmitted through a cable 13 to a control unit 200 installed in the vehicle. The housing 11 has left and right holders 16 and 18 secured to left and right side walls thereof. The housing 11 is movably placed on a base plate 15 through an after-mentioned lift plate (36). The base plate 15 is integrally formed with left and right brackets 20 and 22 between which the housing 11 is vertically movably put.

The right bracket 22 is formed at its horizontal part with a stud portion whose upper end is shaped into a ball 24. The ball 24 is rotatably received in a hollow spherical portion 26 which is possessed by the right holder 18, so that the ball 24 and the spherical portion 26 constitute a so-called ball joint. Thus, the housing 11 is pivotal horizontally about the ball joint relative to the base plate 15.

Figure 2:
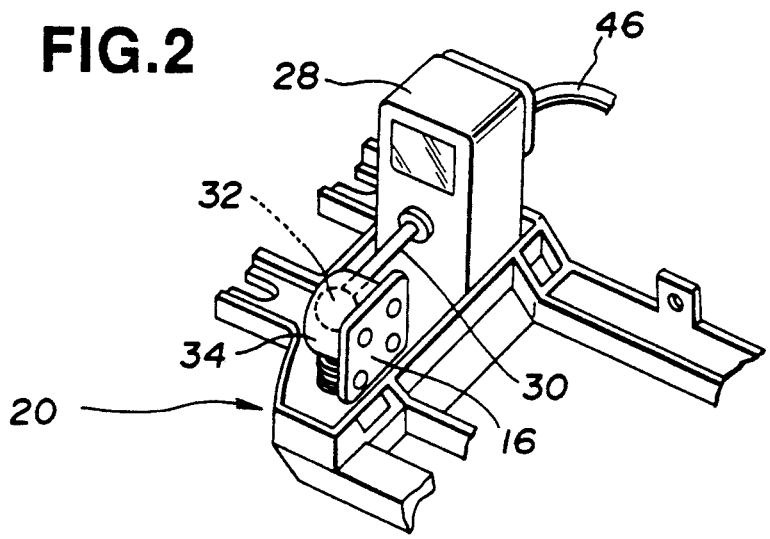
FIG. 2 is a perspective view of a part of the probe unit, with some parts removed for clarification of the drawing.

As is seen from FIG. 2, the left bracket 20 has an electric actuator 28 which has an axially movable spindle 30. The spindle 30 has a spherical head 32 which is rotatably received in a hollow spherical portion 34 possessed by the left holder 16, so that the spherical head 32 and the spherical portion 34 constitute another ball joint. Thus, when, upon energization of the electric actuator 28, the spindle 30 is moved axially, the housing 11 is forced to pivot horizontally about a center of the above-mentioned ball joint (24, 26) relative to the base plate 15.

Denoted by numeral 46 is a cable which extends from the electric actuator 28 to the control unit 200. The electric actuator 28 is controlled by a steering angle sensor 48 discussed below, through the control unit 200.

Referring back to FIG. 1, denoted by numeral 35 is a height adjuster which adjusts the height of the housing 11 relative to the base plate 15. The height adjuster 35 comprises a lift plate 36 interposed between the base plate 15 and the bottom of the housing 11. The lift plate 36 has an upstanding part which extends upward in a vertical channel 38 defined between the right side wall of the housing 11 and the right holder 18. The upstanding part is formed with a plurality of aligned slots. Engaged with the slots is a pawl which is possessed by a head portion 40 of a bolt 42 which is held by the right bracket 22. In order to stably hold the head portion 40, the same is rotatably received in a holder member 44 secured to part of the right bracket 22. Thus, when the bolt 42 is turned about its axis, the pawl of the same lifts or lowers the apertured upstanding part of the lift plate 36 thereby lifting or lowering the housing 11 relative to the base plate 15.

Figure 3:
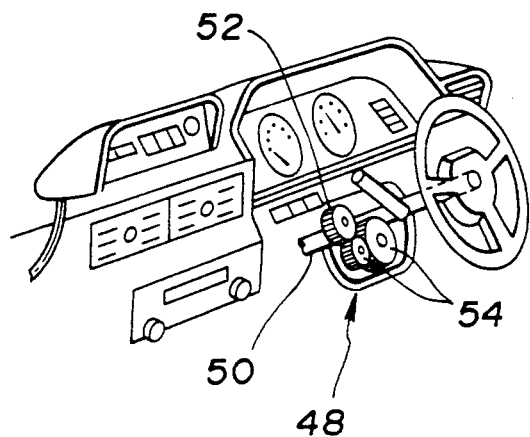
FIG. 3 is a view showing a place where a steering angle sensor is positioned.
Figure 4:
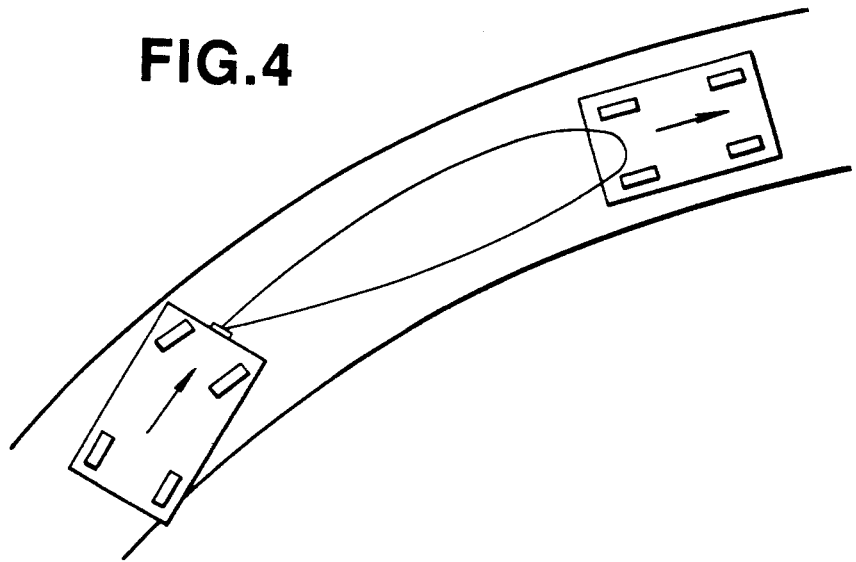
FIG. 4 is a drawing showing an advantage possessed by the equipment of the first embodiment.

Referring to FIG. 3, there is shown the steering angle sensor 48 which detects a steered angle of the vehicle by measuring the rotation angle of a steering shaft 50. The sensor 48 comprises generally a gear 52 driven by the steering shaft 50, a speed reduction mechanism 54 and a counter which counts the number of rotation of the final gear of the speed reduction mechanism 54.

Upon requirements of assembly of the probe unit 10A on the vehicle, the base plate 15 is secured to the front fixed part of the vehicle by means of bolts or the like. Then, the bolt 42 of the height adjuster 35 is manipulated to adjust the height of the probe unit 10A relative to the vehicle body.

It is to be noted that, due to the work of the control unit 200 to which the information signal from the steering angle sensor 48 is fed, the electric actuator 28 is so controlled as to pivot the probe unit 10A face to a direction in which the steered road wheels of the vehicle are directed.

When, in operation, traveling vehicle comes to a curve, the driver turns the steering wheel to steer the vehicle. During this steering, the steering angle sensor 48 detects the steered angle of the vehicle and thus, the control unit 200 pivots the probe unit 10A to face to the desired direction, that is, to the direction in which the steered road wheels are directed. Thus, as is understood from FIG. 4, the laser beam emitted from the laser emitting device 12 can make an exact hit on the front vehicle and thus the laser receiving device 14 can receive the reflected laser beam sufficiently. This means that the equipment can exactly measure the distance between the two vehicles.

Figure 5:
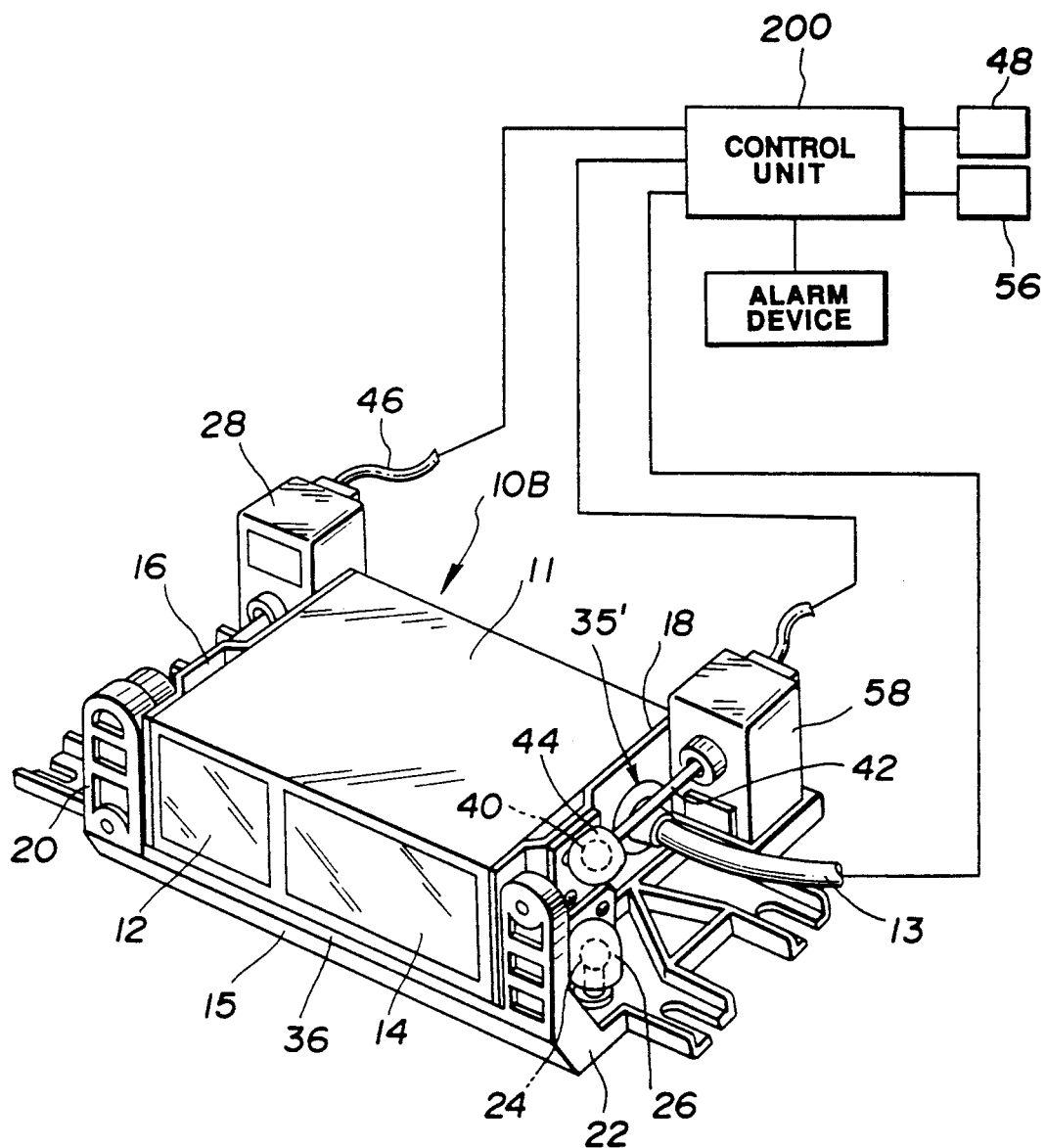
FIG. 5 is a view similar to FIG. 1, but showing a second embodiment of the present invention.

Referring to FIG. 5, there is shown a probe unit 10B used in a second embodiment of the present invention.

The probe unit 10B is substantially the same as the above-mentioned probe unit 10A of the first embodiment except an automatic height adjuster 35′ which will be described in the following.

That is, the height adjuster 35′ employed in the second embodiment is automatically controlled by an inclination sensor 56 mounted on the vehicle.

For achieving this, another electric actuator 58 is used which drives the bolt 42 in accordance with an instruction signal applied from the inclination sensor 56 through the control unit 200.

It is to be noted that due to the work of the control unit 200 to which information signals from the steering angle sensor 48 and the inclination sensor 56 are fed, the electric actuator 28 is so controlled as to pivot the probe unit 10B to face to the desired direction and at the same time the other electric actuator 58 is so controlled as to maintain the probe unit 10B at a given elevation angle. Thus, in this second embodiment, much exact measurement of the distance between the two vehicles is obtained.

Figure 6:
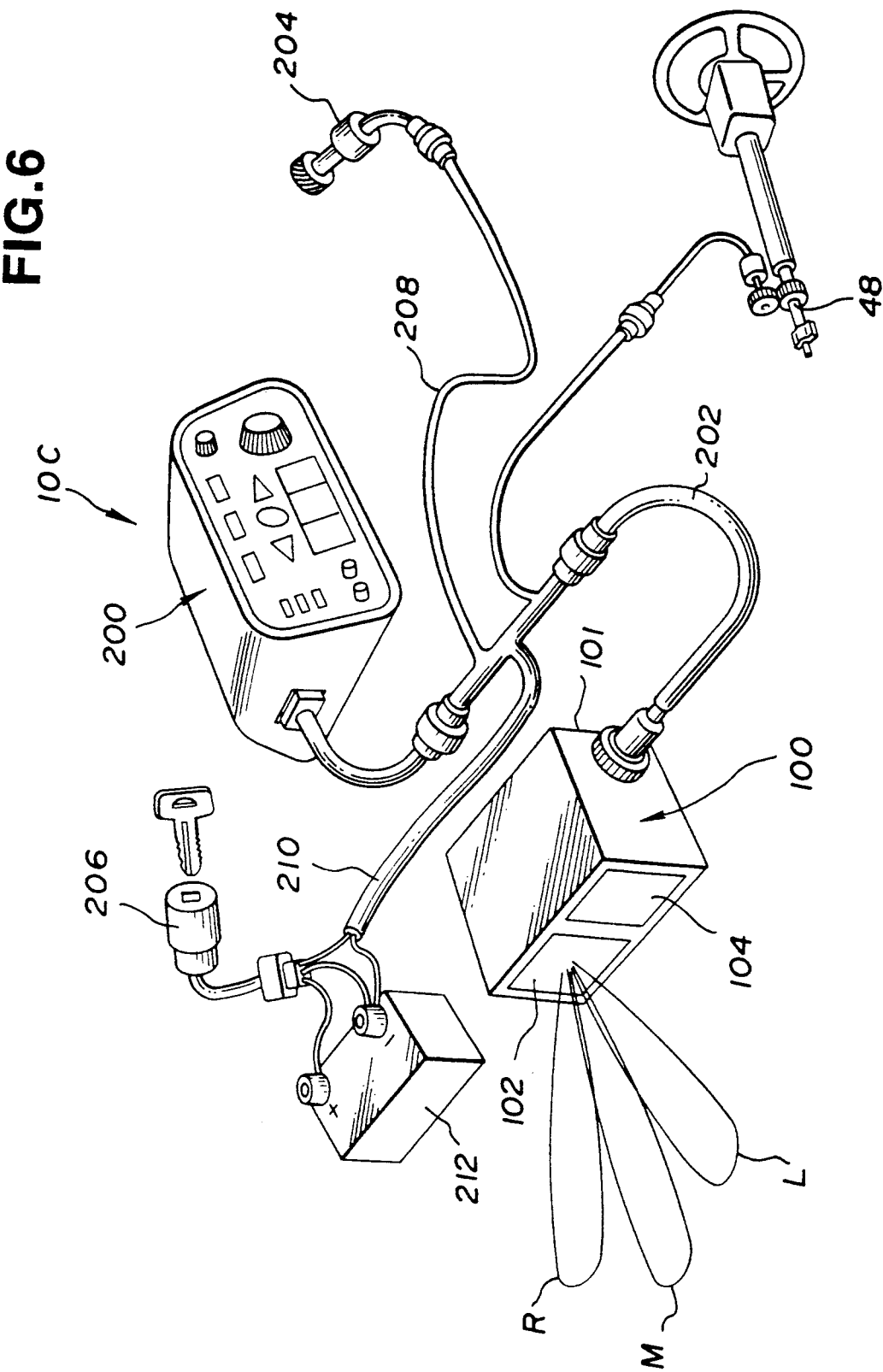
FIG. 6 is a view showing a distance measuring equipment of a third embodiment of the present invention.
Figure 7:
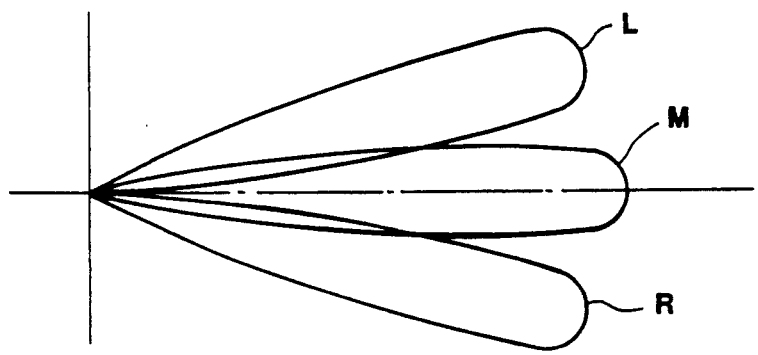
FIG. 7 is a view showing three laser beams emitted from a laser emitting device employed in the third embodiment.
Figure 8:
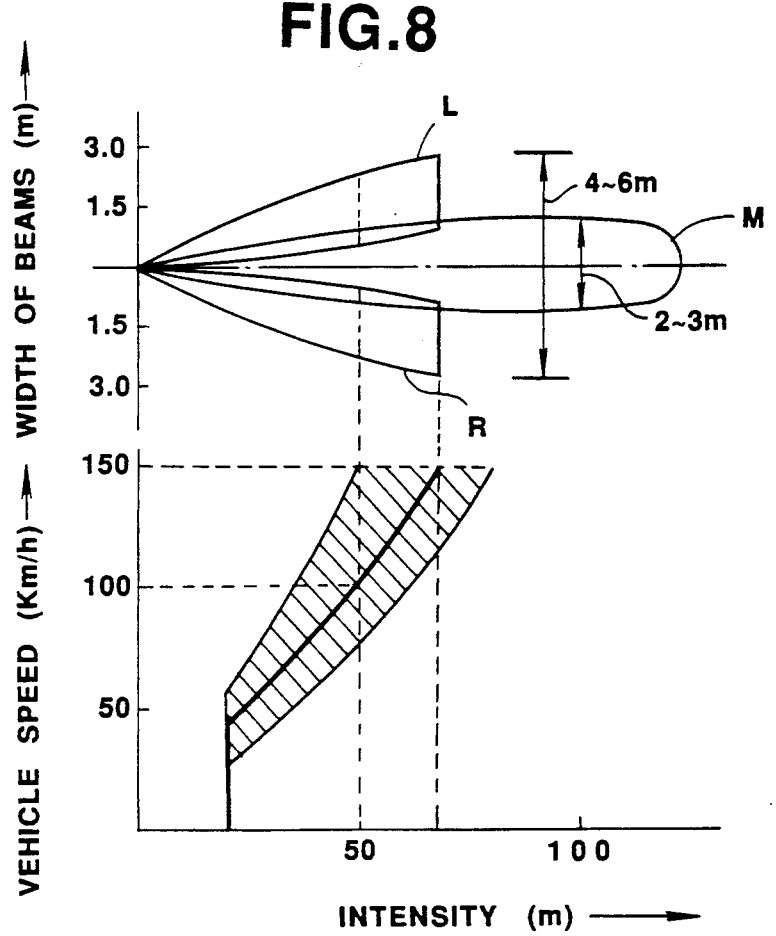
FIG. 8 is a graph showing characteristics possessed by the equipment of the third embodiment.
Figure 9:
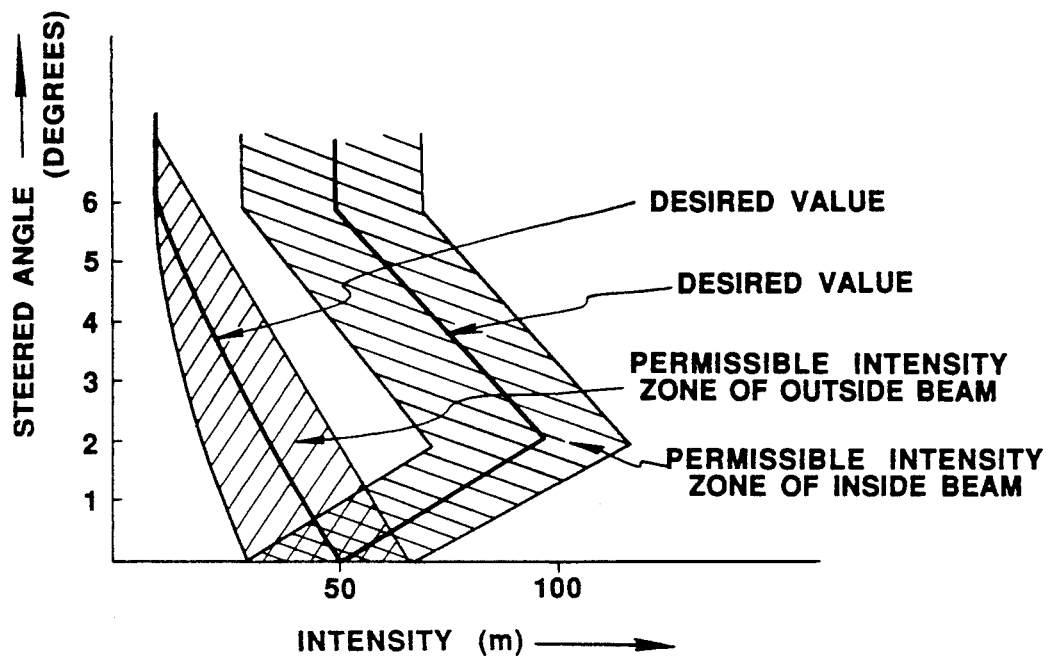
FIG. 9 is graph showing the other characteristic possessed by the third embodiment.
Figure 10:
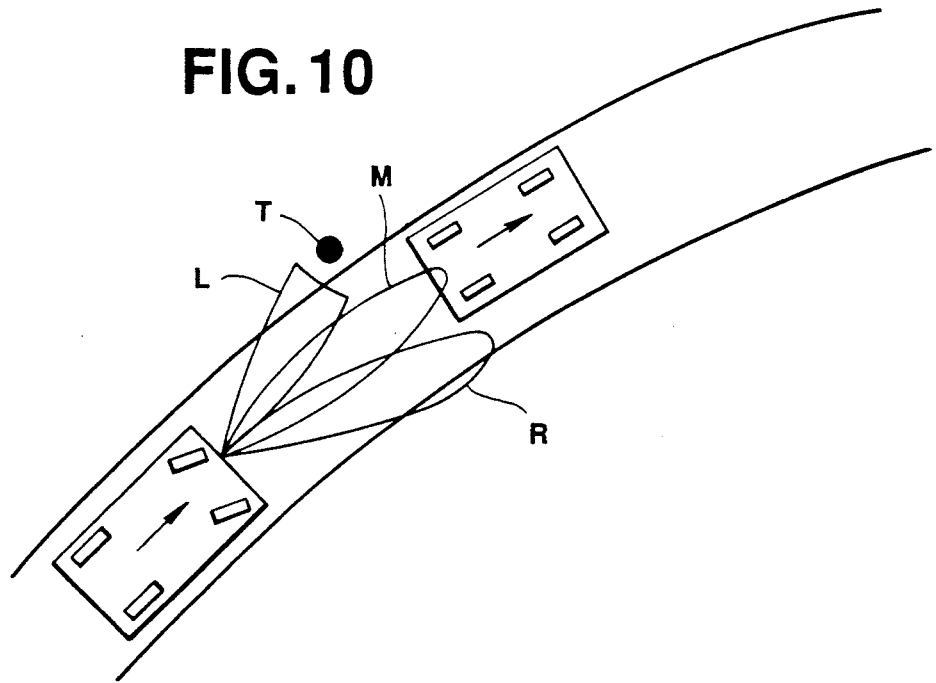
FIG. 10 is a drawing showing an advantage possessed by the third embodiment.
Figure 17:
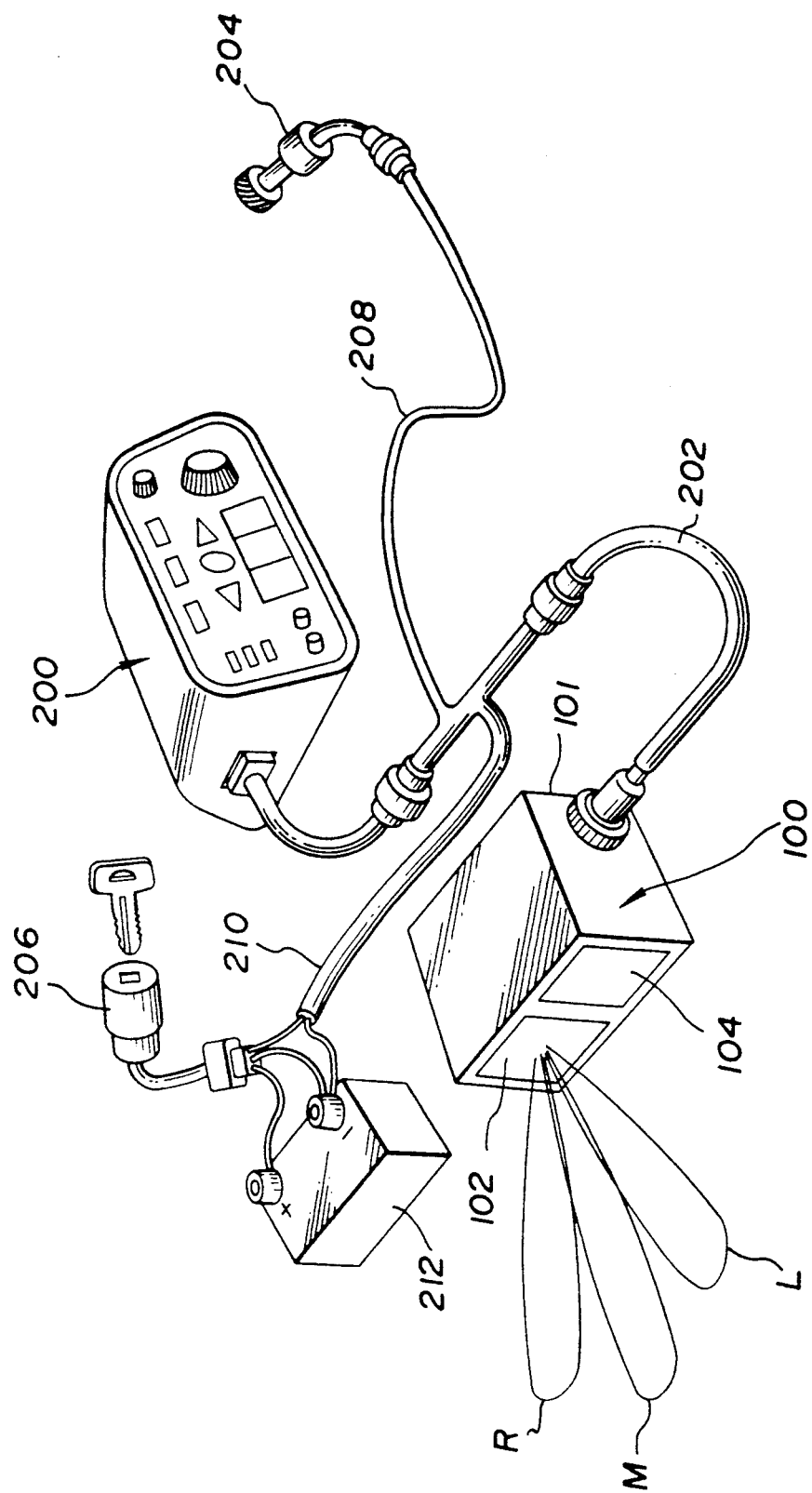
FIG. 17 is a perspective view of a second conventional distance measuring equipment.
Figure 18:
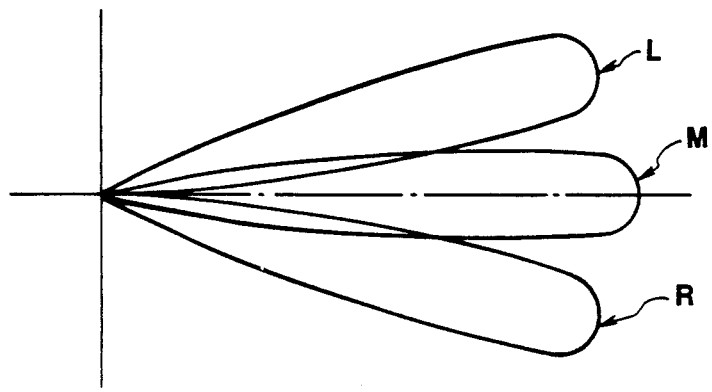
FIG. 18 shows three laser beams emitted from a laser emitting device used in the second conventional distance measuring equipment.
Figure 19:
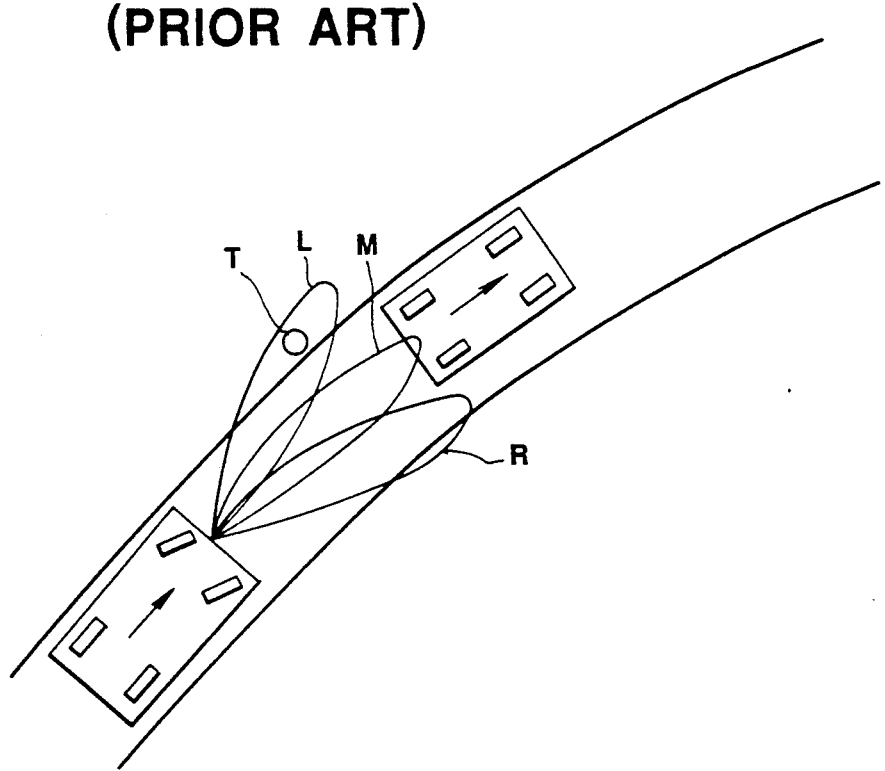
FIG. 19 is a drawing showing a drawback possessed by the second conventional distance measuring equipment.

Referring to FIGS. 6 to 10, particularly FIG. 6, there is shown a distance measuring equipment 10C of a third embodiment of the present invention. The equipment 10C of this third embodiment can eliminate the drawback possessed by the above-mentioned second conventional distance measuring equipment of FIG. 17.

The equipment 10C of this third embodiment is substantially the same as the afore-mentioned second conventional equipment except a steering angle sensor 48. Thus, for simplicity, the detailed description of this third embodiment will be directed to only the steering angle sensor 48 and its associated parts.

That is, in this third embodiment, the steering angle sensor 48 is further employed in addition to the parts used in the second conventional equipment, which sensor 48 feeds the control unit 200 with an information signal representing the steered angle of the steered road wheels of the vehicle.

By analyzing information signals from the steering angle sensor 48, the control unit 200 controls the intensity of the left and right laser beams L and R in accordance with the steered angle of the steered road wheels of the vehicle. That is, when operating the vehicle on a curved road, the intensity of the laser beam L or R which is located outside with respect to the curved road is gradually reduced with increase of steered angle of the vehicle. This will be understood from the graph of FIG. 9 in which the intensity of the laser beam L or R is expressed in terms of the range. That is, the intensity (viz., range) of the laser beam L or R is gradually reduced with increase of the steered angle of the vehicle. From this graph, it is seen that when the steered angle is zero, the intensities of the outside and inside laser beams L and R are both about 50 m, and until the steered angle of about 2 degrees, the intensity of the inside laser beam L or R is gradually increased, but from the steered angle of about 2 degrees to that of about 6 degrees, the intensity of the inside laser beam R or L is gradually reduced.

In addition to such control, by analyzing information signals from the vehicle speed sensor 204, the control unit 200 controls the intensity of the two laser beams L and R in accordance with the vehicle speed. This will be understood from the graph of FIG. 8 which shows the intensity (viz., range) of each laser beam L or R with respect to the vehicle speed in a case wherein the steered angle is zero. As is seen from this graph, the intensity of each laser beam L or R is gradually increased with an increase of the vehicle speed. That is, for example, when the vehicle speed is about 100 km/h, the intensity of the laser beam L or R is controlled to about 50 m, while when the vehicle speed is about 150 km/h, the intensity of the same L or R is controlled to about 70 m.

In fact, in the third embodiment, the intensity of each laser beam L or R is controlled in accordance with the steered angle of the vehicle in combination with the speed of the same. Thus, when, as will be understood from FIG. 10, the vehicle is traveling on a right-curved road, the intensity of the left laser beam L is reduced to such a degree as to fail to make a sufficient reflection on the tree T. This means that the equipment 10C can precisely measure the distance between the two vehicles without being interrupted by the left laser beam L. If desired, in this third embodiment, the middle laser beam M may be also controlled in accordance with the vehicle speed.

Figure 11A:
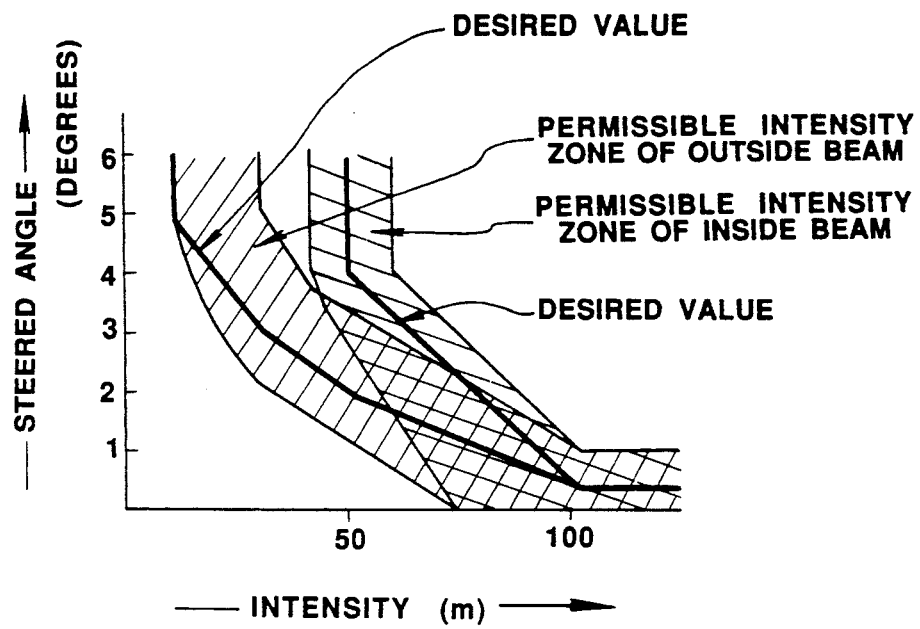
FIGS. 11A, 11B and 11C are drawings showing characteristics possessed by a fourth embodiment of the present invention.
Figure 11B:
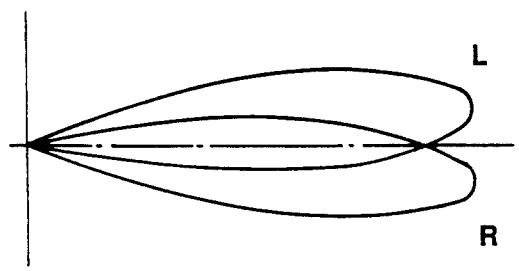
Figure 11C:
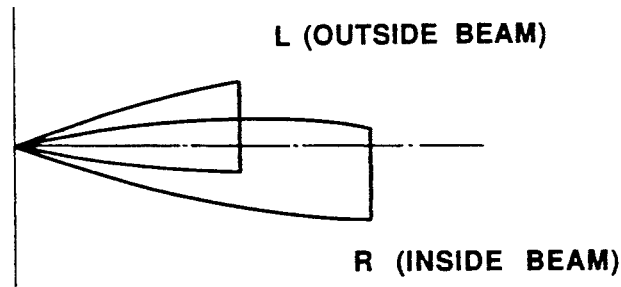

Referring to FIGS. 11A, 11B and 11C, there are shown characteristics possessed by a fourth embodiment of the present invention. In this embodiment, as is seen from FIGS. 11B and 11C, two, that is, left and right laser beams L and R are used. Similar to the case of the third embodiment, the intensity of each laser beam L or R is controlled in accordance with both the steered angle of the vehicle and the speed of the same.

Figure 12A:
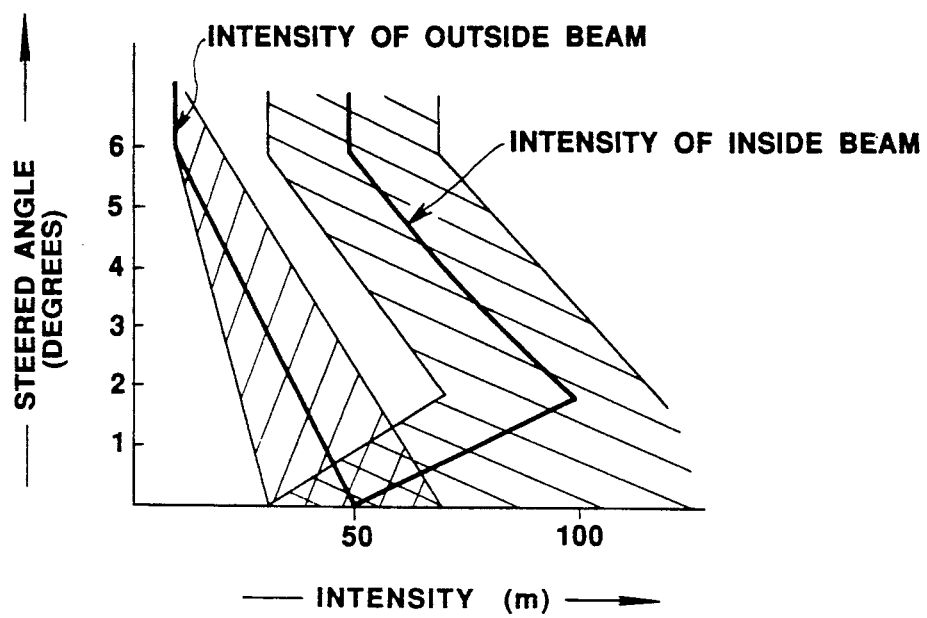
FIGS. 12A, 12B and 12C are drawings showing characteristics possessed by a fifth embodiment of the present invention.
Figure 12B:
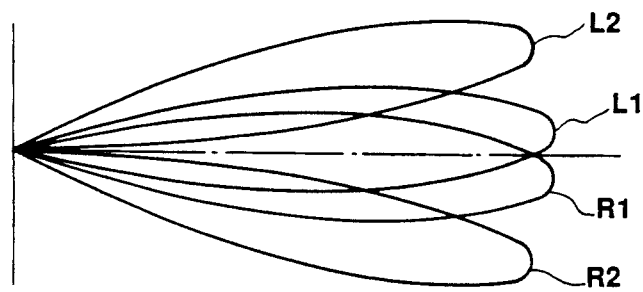
Figure 12C:
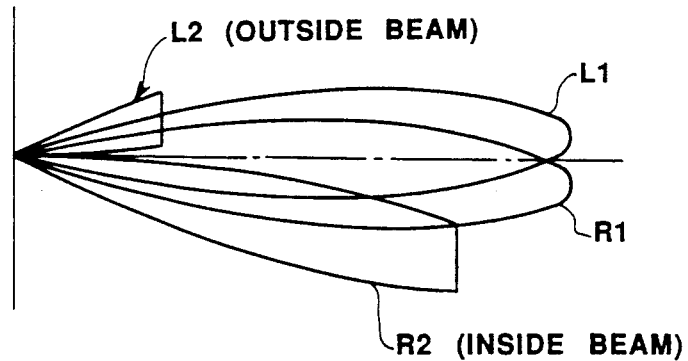

Referring to FIGS. 12A, 12B and 12C, there are shown characteristics possessed by a fifth embodiment of the present invention. In this embodiment, four laser beams L2, L1, R1 and R2 are used. As is seen from FIG. 12C, the intensities of the outermost two beams L2 and R2 are controlled in accordance with both the steered angle of the vehicle and the speed of the same.

Figure 13:
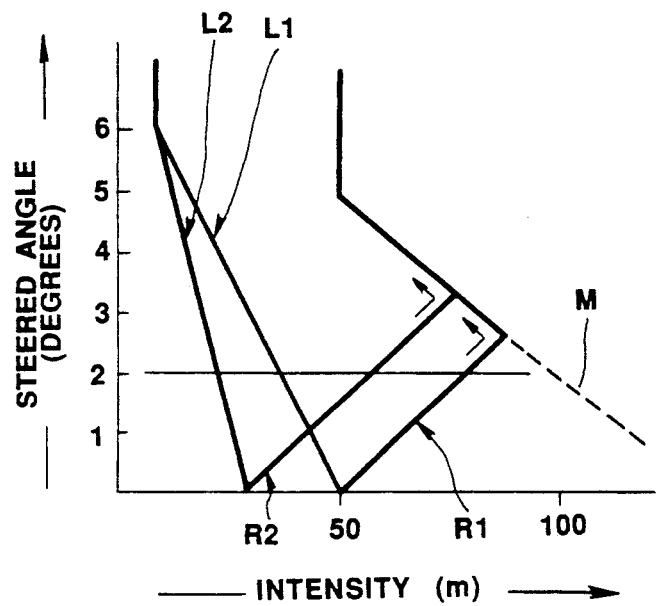
FIGS. 13A and 13B are drawings showing characteristics possessed by a sixth embodiment of the present invention.
Figure 13:
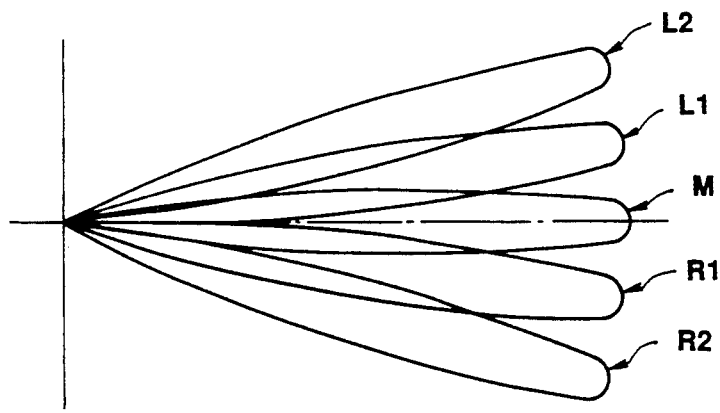
Figure 14:
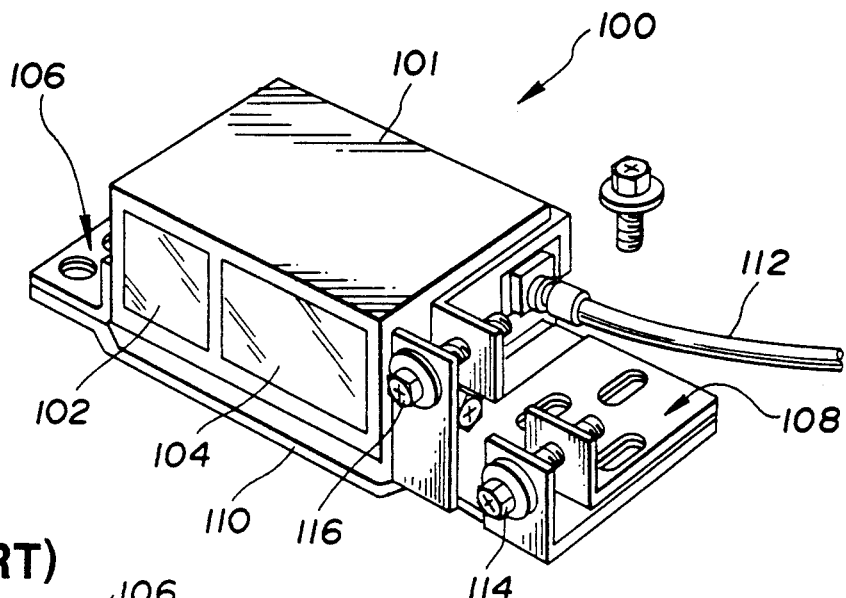
FIG. 14 is a perspective view of a probe unit of a first conventional distance measuring equipment.
Figure 15:
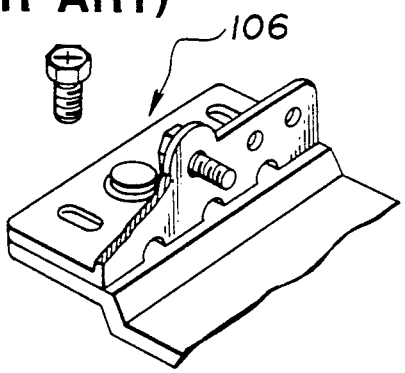
FIG. 15 is perspective view of a part of the probe unit of FIG. 14, with some parts removed for clarification of the drawing.
Figure 16:
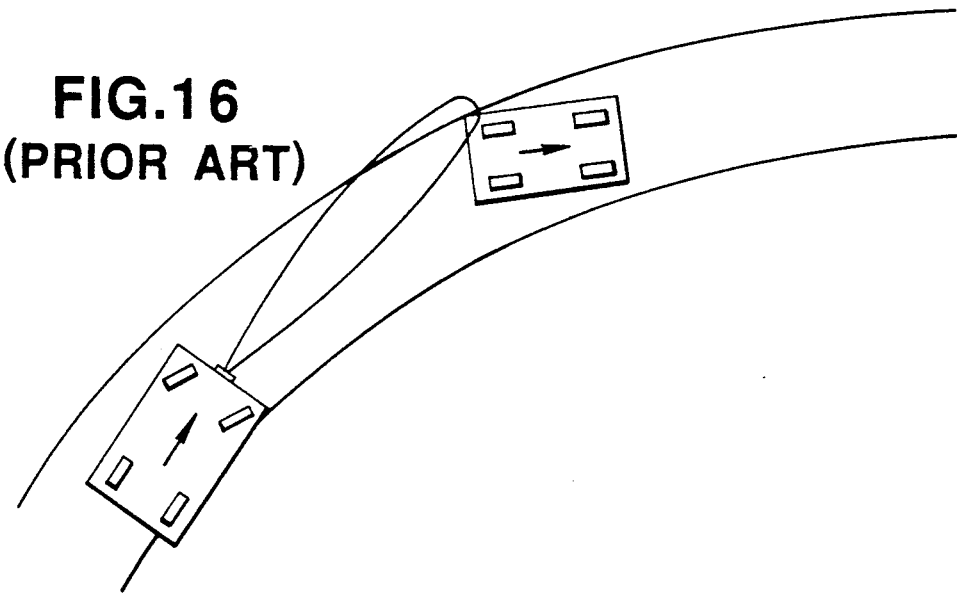
FIG. 16 is a drawing showing a drawback possessed by the first conventional distance measuring equipment.

Referring to FIGS. 13A and 13B, there are shown characteristics possessed by a sixth embodiment of the present invention. In this embodiment, five laser beams L2, L1, M, R1 and R2 are used. As is seen from FIG. 13A, all the beams except the middle beam M are controlled in accordance with both the steered angle of the vehicle and the speed of the same.

In the above-mentioned third to sixth embodiments, controlling of the intensity of a given laser beam is made by controlling the performance of the laser emitting device 102. However, in the present invention, another measure may be also used in which, keeping the intensity of the emitted laser beam constant, the performance of the reflected laser beam receiving device 104 is controlled in accordance with both the steered angle of the vehicle and the speed of the same.

What is claimed is:

1. A laser-radar type distance measuring equipment for a motor vehicle, comprising:
   a probe unit including a laser emitting device and a reflected laser receiving device, said probe unit being adapted to be mounted on a body of said motor vehicle;
   a steering angle sensor for producing an information signal representative of the steered angle of the vehicle by measuring the rotation angle of a steering shaft of the vehicle;
   a control unit for generating an instruction signal in accordance with said information signal from said steering angle sensor; and
   performance changing means for changing the performance of said probe unit including;
   first means for permitting said laser emitting device to emit a plurality of laser beams; and
   second means for changing the performance of at least one of said laser emitting device and said laser receiving device in accordance with said instruction signal from said control unit,
   wherein said second means independently controls the intensities of outermost two of the emitted laser means from said laser emitting device in accordance with said instruction signal from said control unit.

2. A laser-radar type distance measuring equipment as claimed in claim 1, in which said performance changing means is a powered mover which pivotally moves said probe unit relative to the vehicle body in accordance with an instruction signal from said control unit.

3. A laser-radar type distance measuring equipment as claimed in claim 2, in which said powered mover comprises:
   a base member adapted to be mounted on said vehicle body;
   an articulated structure provided on said base member for permitting a horizontally pivotal movement of said probe unit about a center of said articulated structure; and
   an electric actuator which, when energized, moves said probe unit about said center in accordance with the instruction signal from said control unit.

4. A laser-radar type distance measuring equipment as claimed in claim 3, further comprising a height adjuster for adjusting a height of said probe unit relative to said base member.

5. A laser-radar type distance measuring equipment as claimed in claim 4, further comprising:
   an inclination sensor for producing an information signal representative of an inclination angle of said vehicle relative to a road on which said vehicle is placed; and
   another electric actuator for driving said height adjuster in accordance with said information signal issued from said inclination sensor.

6. A laser-radar type distance measuring equipment as claimed in claim 5, in which said control unit is arranged to operate to selectively pivot said probe unit in right and left directions when said steering angle sensor senses right and left turnings of the vehicle.

7. A laser-radar type distance measuring equipment as claimed in claim 1, in which said control unit is arranged to operate to reduce the intensity of the leftmost laser beam when said steering angle sensor senses a right turning of the vehicle and to reduce the intensity of the rightmost laser beam when said steering angle sensor senses a left turning of the vehicle.

8. A laser-radar type distance measuring equipment as claimed in claim 7, further comprising a vehicle speed sensor for controlling the intensities of the outermost laser beams in accordance with both the steered angle of the vehicle and the speed of the same.

9. A laser-radar type distance measuring equipment as claimed in claim 8, in which the number of the laser beams emitted from said laser emitting device is two, three, four or five.

10. A laser-radar type distance measuring equipment for a motor vehicle, comprising:
    a probe unit including a laser emitting device and a reflected laser receiving device, said probe unit being adapted to be mounted on the vehicle, said laser emitting device being constructed to emit a plurality of laser beams;
    a steering angle sensor for producing an information signal representative of the steered angle of the vehicle by measuring the rotation angle of a steering shaft of the vehicle;
    a vehicle speed sensor for producing an information signal representative of the speed of the vehicle; and
    a control unit for controlling intensities of outermost two of said laser beams in accordance with the information signals from said steering angle sensor and said vehicle speed sensor.

11. A method of independently controlling the intensities of a plurality of laser beams which are part of a laser radar distance measuring system mounted in a motor vehicle, comprising the steps of:

measuring the rotation angle of a steering shaft of said motor vehicle, resulting in a steering information signal;

generating a speed information signal representing the speed of said motor vehicle; and independently controlling the intensities of outermost two of said plurality of laser beams in accordance with said speed information signal and said steering information signal.

* * * * *